Aug. 7, 1962
V. A. HOOVER
3,048,760
MOTOR CONTROL BY MECHANICAL ACTUATOR WITH
INTERMEDIATE POSITION CAM ARRANGEMENT
Original Filed April 14, 1953
2 Sheets-Sheet 1
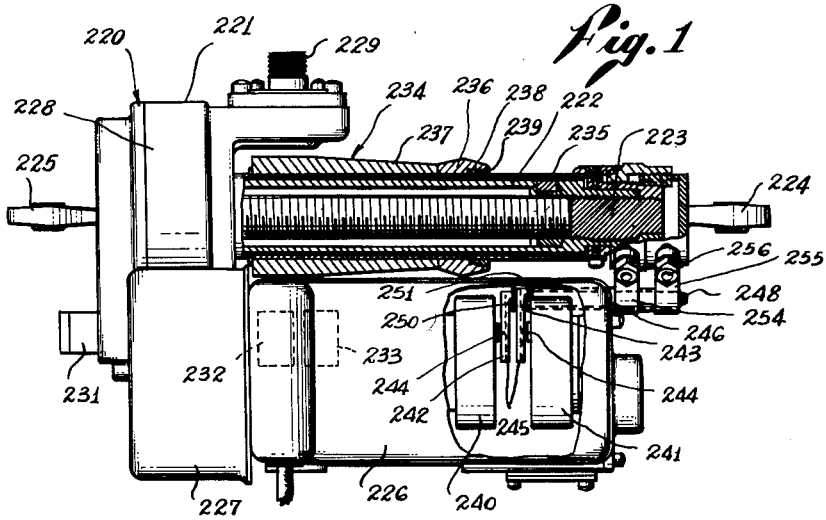
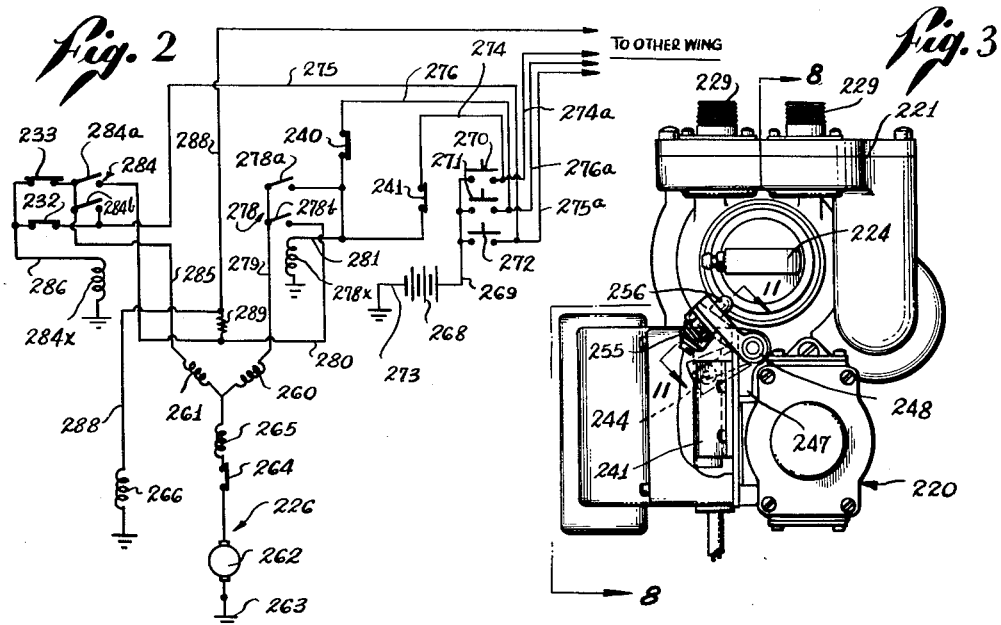
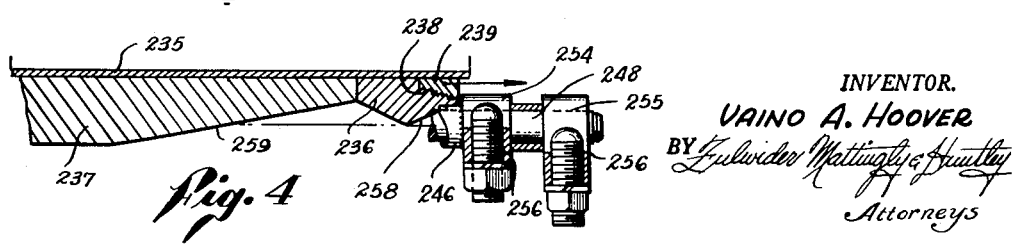
INVENTOR.
VAINO A. HOOVER
BY *Fulwider Mattingly & Huntley*
Attorneys Aug. 7, 1962 V. A. HOOVER 3,048,760
MOTOR CONTROL BY MECHANICAL ACTUATOR WITH
INTERMEDIATE POSITION CAM ARRANGEMENT
Original Filed April 14, 1953 2 Sheets-Sheet 2
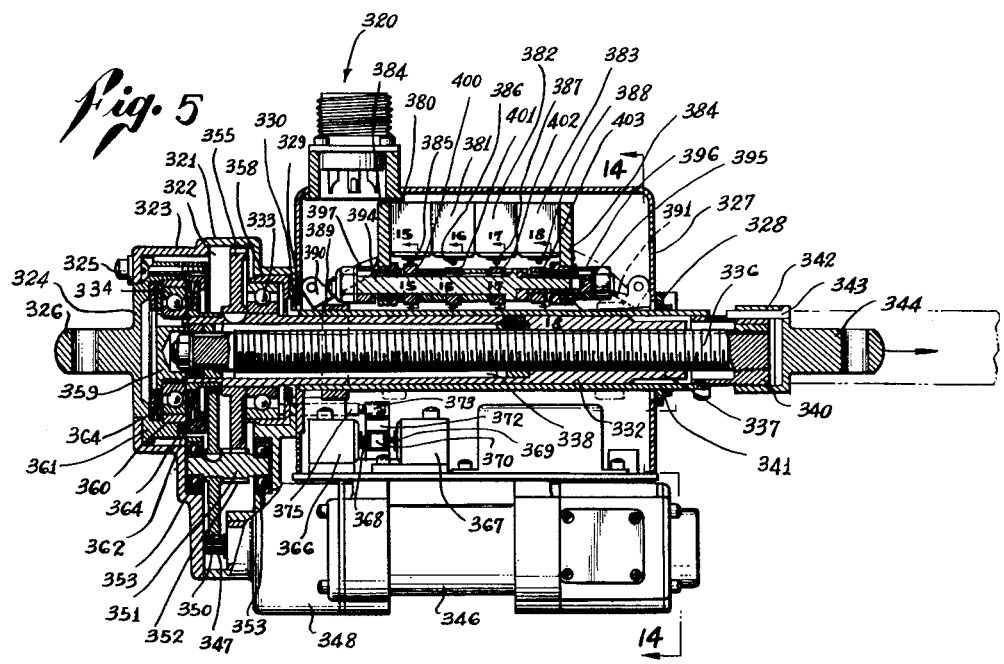
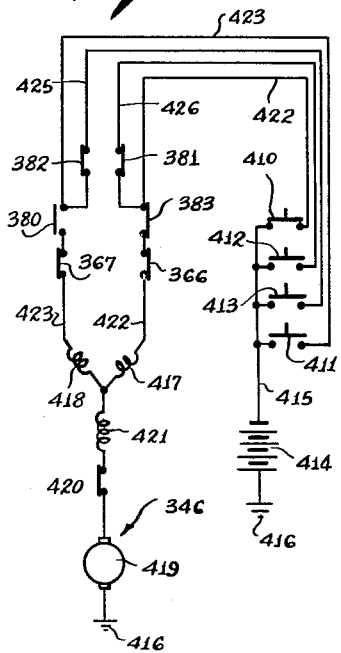
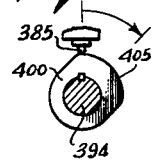
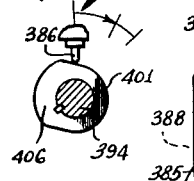
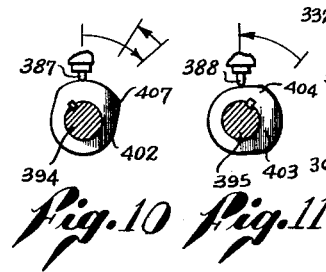
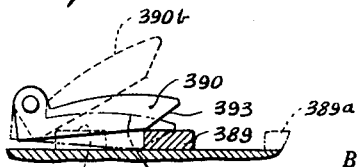
INVENTOR.
VAINO A. HOOVER
BY
Attorneys United States Patent Office 3,048,760
Patented Aug. 7, 1962

1

3,048,760
MOTOR CONTROL BY MECHANICAL ACTUATOR WITH INTERMEDIATE POSITION CAM ARRANGEMENT
Vaino A. Hoover, Los Angeles, Calif.
(1433 San Vicente Blvd., Santa Monica, Calif.)
Original application Apr. 14, 1953, Ser. No. 348,741. Divided and this application Aug. 12, 1957, Ser. No. 677,737
10 Claims. (Cl. 318—467)

This application is a division of my copending application, Serial No. 348,741, filed April 14, 1953, now Patent No. 2,809,736 issued October 15, 1957, and entitled "Mechanical Actuator," and relates particularly to improved cam mechanisms used in such actuators for determining the limits of their travel.

This type of actuator uses an electric motor to rotate one member of a cooperating nut and screw assembly, for providing relative longitudinal movement. The actuator can develop a relatively great linear thrust force, and is very advantageous for use in the remote positioning of various devices since it may be connected to the control station by simple electrical circuits. Because of their compact size and light weight, such actuators are used frequently in aircraft for the remote positioning of control surfaces, canopies, doors, and the like, which are controlled from the cockpit of the plane.

In many of these installations it is desirable not only that the actuator be capable of stopping itself at the limits of its travel, but that it also have means which, when required, can stop it at some predetermined intermediate point. In positioning the wing flaps of aircraft, for example, it is often desirable that the flaps be positionable at an intermediate point such as half-extended, as well as at the extended and retracted positions. Also, in the operation of aircraft canopies, an intermediate "park" position is often desired as well as open and closed.

It is therefore a major object of my invention to provide a mechanical actuator which can be stopped at some predetermined intermediate position of its travel, as well as at the limits.

Another important object of my invention is to provide a mechanical actuator of the type described in which the positioning control is actuated by cam means that move linearly with the actuator screw.

A further object of my invention is to provide a mechanical actuator of the type described in which the intermediate position may be adjusted without changing the limits, or the limits can be adjusted without varying the intermediate position.

Still another object of my invention is to provide a mechanical actuator as described above which is simple, inexpensive and substantially foolproof in operation.

These and other objects and advantages of the invention will become apparent from the following detailed description of preferred and modified forms thereof, and from an inspection of the accompanying drawings, in which:

FIGURE 1 is a side elevation partially in section of my invention embodied in a wing flap actuator;

FIGURE 2 is a partial wiring diagram of the electrical control circuit for a pair of actuators of the type shown in FIGURE 1;

FIGURE 3 is an end view of the actuator shown in FIGURE 1;

FIGURE 4 is an enlarged detail of the ring cam and limit switch operators taken along line 4—4 in FIGURE 3;

FIGURE 5 is a longitudinal medial section of my invention embodied in a canopy actuator;

2

FIGURE 6 is a wiring diagram of the electrical control circuit for the canopy actuator of FIGURE 5;

FIGURE 7 is a cross-section through the canopy actuator taken along the line 7—7 of FIGURE 5;

FIGURES 8 through 11 are cross-sectional details of the switch-operating cams taken along the lines 8—8 to 11—11, respectively, in FIGURE 5; and FIGURE 12 is a detail of the left hand cam follower and ring cam shown in FIGURE 5.

Referring now to the drawings, and particularly to FIGURES 1 through 4 thereof, a preferred form of my invention is shown embodied in a wing flap actuator 220. The actuator 220 is generally similar in form to the actuator disclosed in my Patent 2,809,736, but has different control means.

The purpose of the modified control means is to provide for the extension of the actuator screw to an intermediate position which is reached by operating a separate control switch. Thus, when actuator 220 is used to control the wing flaps of an aircraft, the flaps can be accurately stopped in a half-extended position, or in some other intermediate position determined by the setting of the control cams.

As is best seen in FIGURE 1, the actuator 220 has a housing 221 in which is mounted a rotatable and axially immovable elongated nut 222. Engaged within nut 222 is an axially movable and non-rotatable screw 223 carrying on its outer end an attaching ear 224 which is linearly movable with respect to an opposite ear 225 secured to housing 221. The means for driving nut 222 are the same as those in my above-mentioned patent, and include a motor 226 driving through a magnetic clutch and brake unit 227 to a reduction gear drive 228, which is in turn connected to the driving nut.

At the top of housing 221 are a pair of coupling receptacles 229 which have therein driving pinions adapted for connection with a flexible shaft to mechanically interconnect the driving nuts 222 of a pair of actuators in the manner described in my copending application referred to herein. Mechanical limit stops similar to those mentioned in my copending application are also provided, and means for insuring full retraction of screw 223 against the inner stop, including a load-limiting mechanism 231 connected to a load limit switch 232. A load limit shorting switch 233 is connected across switch 232 so as to render the latter ineffective to de-energize motor 226. Shorting switch 233 has an actuating lever (not shown) which is positioned so as to be moved in a direction to open the electrical contacts of switch 233 when screw 223 has approached the inner limit of its travel. Thus load limit switch 232 is effective only when the inner mechanical stops are about to engage. As can be appreciated, the device thus far described has the same construction as the actuator in my Patent No. 2,809,736, and it is not necessary to repeat the details of operation thereof.

In order to actuate the limit switches, a ring cam means 234 is mounted on an outer covering tube 235 which is affixed for linear movement with screw 223. Cam means 234 has an outer longitudinally adjustable collar member 236 and an inner elongated tapered sleeve 237 which is fixed in position relative to tube 235. Collar 236 has an internally threaded tapered socket portion 238 that takes a split collet-like lock ring 239 permitting the collar 236 to be moved to any desired location on the tube 235 and there secured by the clamping of the lock ring 239 by relative rotation of the parts 238 and 239.

Mounted on the motor 226 is an "intermediate" limit switch 240 and an "extend" limit switch 241 that are normally closed in the motor circuit, and adapted to be opened by the cam means 234. When "intermediate" limit switch 240 is opened, screw 223 is stopped accurately at an intermediate position determined by the longitudinal adjustment of collar 236 with respect to tube 235, and when the "extend" switch 241 is opened the screw is stopped in a fully extended position.

To operate switches 240 and 241 I provide actuating arms 242 and 243, respectively, which are pivotally mounted adjacent switch plungers 244 extended outwardly from the adjacent sides of the switches. Upon inward depression of plungers 244, electrical contacts within the switches are moved from a closed to an open position. The arms 242 and 243 each have wedge-shaped surfaces 245 lying in a plane at right-angles to the axis of movement of plungers 244 and provided with thicker trailing portions which depress the plungers upon pivotal movement thereby. As is viewed in FIGURE 10, pivotal movement of arms 242 and 243 in a counterclockwise direction causes plungers 244 to be depressed.

Arm 242 is affixed to a tubular shaft 246 which is rotatably supported in a bracket 247 secured to the housing of motor 228, and arm 243 is affixed to a shaft 248 which extends concentrically through shaft 246 and is rotatable therein. Coil springs 250 and 251 are wound around shafts 246 and 248 and secured between a fixed abutment and arms 242 and 243 in such a manner as to urge counterclockwise pivotal movement (FIGURE 10) thereof. Shaft 246 extends outwardly parallel to screw 223 and has fixed on its outer end an "intermediate" crank arm 254. Shaft 248 extends beyond crank arm 254 and has fixed on its outer end an "extend" crank arm 255. Both arms 254 and 255 project upwardly and carry on the free end thereof adjustable engagement screws 256 which lie in the path of movement of the cam means 237.

As is best seen in the enlarged detail of FIGURE 4, the free end of "intermediate" crank arm 254 is spaced closer to the cover tube 236 than is arm 255, when both lie in their normal positions to which they are urged upwardly by springs 250 and 251. The cam collar 236 is of triangular section to provide a forward cam rise 258 which is adapted to engage "intermediate" crank 254 to pivot the same downwardly, but moves outwardly along a path, indicated in phantom line, that does not engage "extend" crank 255.

The tapered cam sleeve 237 which lies inwardly of collar 236 is of greater diameter than the collar and has formed thereon a cam rise 259 which is of a height sufficient to engage against the "extend" crank 255 and cause it to pivot downwardly. When crank 254 is pivoted downwardly, "intermediate" limit switch 240 is opened, and when crank 255 is pivoted downwardly, "extend" limit switch 241 is opened. Since the point of contact between crank 255 and cam rise 259 is spaced axially inwardly from the point of contact between cam rise 258 and crank 254, it can be seen that as screw 223 travels outwardly it causes switch 240 to be opened at an intermediate position of travel, and switch 241 to be opened in an extended position of travel. Thus switches 240 and 241 are properly actuated to control the movement of screw 223 to intermediate and extended positions. The location of the intermediate position may be adjusted within limits as desired merely by adjusting the location of the ring cam 236 on the tube 235, such adjustment being permitted by the collet-like construction above described.

The electrical circuit for controlling the operation of motor 226 is shown in FIGURE 2. Motor 226 is of the split series field type having "extend" and "retract" field windings 260 and 261 each connected in series with the motor armature 262, one terminal of which is grounded as indicated at 263. Between field windings 260—261 and armature 262 is a thermal over-load switch 264 and a clutch energizing coil 265. The clutch coil 265 and a brake releasing coil 266 are both part of the magnetic clutch and brake unit 227 which connects motor 226 with drive gearing 228. Upon energization of coil 265 motor 226 is positively coupled to gearing 228, while upon energization of the auxiliary coil 266 the brake means holding gearing 228 against rotation are released.

Operation of the motor 226 is controlled by three control switches herein designated for convenience "extend" switch 270, "intermediate" switch 271, and "retract" switch 272. Like terminals of these three switches are connected together and to one terminal of a suitable source of D.C. power 268 as by a conductor 269, and the other power supply terminal is grounded as shown at 273.

Closing "extend" switch 270 connects power supply 268 and conductor 269 to an "extend" line 274 to thus energize the coil 278x of a relay 278, the coil 278x being connected between ground and a conductor 281 which is in turn connected to the "extend" line 274 by the normally closed contacts of the "extend" limit switch 241. Energization of relay coil 278x closes relay contacts 278a to connect conductor 281 to the "extend" field 260 of the motor 226 through conductor 279, thus energizing the motor 226 to drive the screw 223 toward the extended position. When the extended position is reached, "extend" limit switch 241 opens, de-energizing relay coil 278x and de-energizing motor 226 and clutch coil 265 with the resulting application of the brake to hold the apparatus in the extended position.

In a similar way, closing "intermediate" control switch 271 energizes an "intermediate" line 276 which is connected to the aforementioned conductor 281 through the normally closed contacts of the "intermediate" limit switch 240. In this way, the relay 278 is actuated and the motor 226 is operated in the extending direction until the operation is arrested by the opening of the "intermediate" limit switch 240 and the consequent de-energization of relay 278, motor 226 and clutch coil 265.

On the other hand, closing "retract" control switch 272 energizes a "retract" line 275 to thus energize the coil 284x of a relay 284, the coil 284x being connected between ground and a conductor 286 which is in turn connected to the "retract" line 275 by the normally closed contacts of the load limit switch 232. Energization of the relay coil 284x closes relay contacts 284a to connect the "retract" line 275 through conductor 285 to the "retract" field 261 of the motor 226, thus energizing the motor 226 to drive the screw 223 toward the retracted position.

Normally closed contacts of the "retract" limit switch 233 are connected between conductors 285 and 286 to short out the load limit switch 232 to render the latter ineffective to stop the operation of the motor 226 until the switch 233 is opened by close approach to the fully retracted position. When the mechanical stops are engaged at the fully retracted position, the load limit switch 232 opens, and, since the "retract" limit switch 233 is also open, de-energizes the relay 284, the motor 226, and the brake 265 so that the device is arrested and securely held in the fully retracted position.

The auxiliary brake release coil 266 is connected between ground and an "interlock" conductor 288 which is in turn connected to one end of a current limiting resistance 289. The other end of the resistance 289 is connected to a conductor 280 which is connected through normally open contacts 278b of the relay 278 to the aforementioned conductor 279, and through normally open contacts 284b of the relay 284 to the aforementioned conductor 285. In this way, the auxiliary coil 266 is energized whenever power is supplied to the motor 226, whether by operation of the relay 278 or by operation of the relay 284.

In FIGURE 2 I have shown the circuit for only a single actuator 220, with leads 274a, 275a and 276a joined to the conductors 274, 275, and 276, respectively, extending outwardly for connection to the circuit of a paired actuator. When actuator units 220 are paired they are mechanically cross-connected so that both will be driven from the motor 226 of one actuator in the event of a failure of the other motor. To permit this it is necessary that the auxiliary brake releasing coil 266 of each actuator be energized through the circuit of the other actuator, in order to release the brake means holding the drive gearing 228 against rotation. This result is secured by the "interlock" conductor 288.

As was previously described, the "interlock" conductor 288 is connected to both of relays 278 and 284 so that voltage is applied thereto whenever either of the relays are closed to drive motor 226. This energizes coil 266 from the opposite actuator circuit, even though the motor 226 of the first actuator has failed. The purpose of resistances 289 is to cause sufficient voltage drop to prevent any substantial current flow through the field windings of the deenergized motor 226, while permitting energization of coils 266. By energizing coils 266 the drive gearing 228 is released so that both actuators 220 may be driven simultaneously.

In FIGURES 5 to 12 I have illustrated another form of actuator 320 which is designed for a different purpose than the form just described. The actuator 320 is advantageous for use in actuating an aircraft canopy, or the like, which is movable linearly to fully retracted or extended positions, and to an intermediate "parked" position. In an installation of this type it is also desirable that the thrust applied by the actuator be limited to a predetermined amount both during extension and retraction.

Actuator 320 has a housing 321 which forms a chamber 322 closed at one end by a cover 323. A plate 324 is removably secured in the upper portion of cover 323 by fastening means such as bolts 325, and projecting outwardly from the plate is an ear 326. This end of housing 321 is attached rigidly to a suitable fixed frame member by connection to ear 326. At the end of housing 321 opposite cover 323 is an elongated rectangular casing 327 which supports control means later to be described. Casing 327 has outer and inner end openings 328 and 329, respectively, and the latter registers with an end opening 330 formed in housing 321.

An elongated tubular nut 332 is extended outwardly from housing 321 through opening 330, and passes through cover 327 with substantial clearance to openings 328 and 329. Nut 332 is rotatably supported in housing 321 by a main ball bearing 333 and a smaller bearing 334. Extending coaxially within nut 332 is an elongated externally threaded screw 336 which is threadedly engaged with an internally threaded nut end portion 337. The remaining interior portion of nut 332 is of enlarged diameter forming a smooth-walled bore 338 which has substantial clearance with screw 336.

At the outer end of screw 336 a sleeve 340 is engaged thereon, and attached to a thin-walled tubular cover 341 which slidably covers nut 332, and slidably passes through openings 328 and 329. Secured threadedly to the outer end of sleeve 340 is a head 342 which is locked adjustably against rotation by a key 343. Head 342 projects outwardly and carries an ear 344 that is aligned with the opposite end ear 326 and is linearly movable with respect thereto. Ear 326 is adapted to be secured to a suitable driving linkage (not shown), the nature of which is such as to hold the ear, and in turn, screw 336 against rotation. Therefore, upon rotation of nut 332, screw 336 will be extended or retracted relative thereto, to provide the desired linear actuation.

In order to rotate nut 332 I provide a reversible electric motor 346 which is mounted on the bottom portion of housing 321. Motor 346 is connected to a driving pinion 347 through a magnetic clutch and brake unit 348 of the type previously described. Pinion 347 is located within the bottom of housing chamber 322, and is meshed with a spur gear 350 affixed to a shaft 351 that is formed with a pinion 352. Shaft 351 is rotatably supported by end bearings 353, mounted rigidly in housing 321 and cover 323, and is held against axial movement.

Near the inner end of nut 332 adjacent bearing 333, a spur gear 355 is keyed for rotation with the nut and is meshed with pinion 352. It should be noted that the width of pinion 352 is substantially greater than that of gear 355 so that the latter may slide axially while remaining in driving mesh with the pinion. By reason of the drive gearing just described, rotation of motor 346 causes rotation of nut 332 in accordance with the direction of rotation of the motor, to extend or retract screw 336.

In order to limit the thrust exerted by screw 336 during both extension and retraction, I support nut 332 for limited axial movement, and center it between opposed sets of spring means which are yieldable when a predetermined thrust load has been reached. The resulting axial movement of nut 332 is used to open load limit switches for de-energizing motor 346. To accomplish this result, the outer race of bearing 333 is slidably mounted in a cup-shaped seat 358 secured adjacent housing opening 330, and the inner race is secured rigidly to nut 332. Threadedly engaged in the end of nut 332 is a flanged cap 359 which locks the inner race of bearing 334 rigidly to nut 332, while the outer race is slidably seated in a ring 360.

Ring 360 forms a part of a load-limiting mechanism which is formed as a sub-assembly supported on end plate 324. A fixed flanged portion 361 projects inwardly from plate 324 and forms a shallow seat for the outer portion of ring 360. The inner portion of ring 360 is held within a similar shallow seat formed in a retaining member 362 which is secured to flanged portion 361 by the bolts 325. Ring 360 is thus held firmly against axial movement, and has a portion of its side faces projecting radially inwardly beyond the seat portions of flange 361 and retainer 362.

At both sides of ring 360 and bearing 334 sets of conically tapered washer-like springs 364 are mounted within flange 361 and retainer 362. Each set of springs 364 comprises a pair mounted in opposed tapered relationship, and held against outward movement by engagement with flange 361 and retainer 362. The exposed side faces of ring 360 act as stops limiting the inward movement of springs 364, which are preloaded by pulling retainer 362 toward flange 361 through bolts 325.

As the outer race of bearing 334 moves slidably in either direction it engages one set of springs 364 and, whenever the thrust loading thereon exceeds the preload force which the springs are exerting due to their compressed condition, compresses the spring thus allowing axial movement of nut 332. If the thrust load does not exceed the pre-load on the springs, as is the case for normal operating loads, the springs act as shoulders and rigidly fix the axial position of the nut. When the thrust load does exceed the predetermined limit, axial movement of nut 332 causes axial movement of the outer race of bearing 333, and this motion is utilized to open left and right hand load limit switches 366 and 367 which are mounted on the housing of motor 346.

Switches 366 and 367 are mounted in side-by-side spaced relationship and have opposed operating plungers 368 and 369, respectively, extending outwardly from the adjacent side faces. Both switches 366 and 367 are normally closed switches connected into the circuit of motor 346, and are operable to open internal electrical contacts upon depression of plungers 368 and 369 so as to de-energize the motor. Between buttons 368 and 369 is an actuating arm 370 which moves pivotally from side to side to depress one or the other of the switch buttons.

As is best seen in FIGURE 7, arm 370 is pinned to a vertical shaft 371 which is rotatably supported in a bifurcated bracket 372 secured rigidly to the housing structure. Affixed to the upper end of shaft 371 is a short crank arm 373 which extends outwardly parallel to arm 370. A spring 374 is wound around shaft 371 and secured between arm 370 and bracket 372 so as to urge pivotal movement of the arm to the left as viewed in FIGURE 5, or in a direction to depress plunger 368.

A slidable plunger or arm 375 is mounted in housing 321 and has an inner end which extends inwardly to bear against the bottom of the outer race of bearing 333. The outer end of plunger 375 is threadedly engaged in crank arm 373 so as to be linearly adjustable with respect thereto. Because of the action of spring 374, plunger 375 is urged to bear firmly against the race of bearing 333 and is thus slidably movable therewith, in accordance with the axial movement of nut 332.

If during the extension of screw 336 the thrust load becomes excessive, the left-hand set of springs 364 yields, and nut 332 and bearing 333 slide to the left within housing 321. Plunger 375 follows bearing 333 under the urging of spring 375 and pivots crank 373. Movement of crank 373 in this direction causes arm 370 to depress plunger 368 and open the contacts of switch 366. As can thus be seen, switch 366 may be considered the "extend" load limit switch.

If during the retraction of screw 336 thrust load becomes excessive, the right-hand set of springs 364 yields and nut 332 and bearing 333 slide to the right. Plunger 375 is driven to the right and pivot crank 373 in the opposite direction. Arm 370 then pivots in a direction to depress plunger 369 and open the contacts of switch 367, which may therefore be considered the "retract" load limit switch.

While the mechanical stops for limiting the travel of screw 336 are the same as described for the first embodiment of my invention, and therefore need not be again considered, the arrangement of electrical limit switches for controlling the operation of motor 346 is somewhat different. As will be remembered, this present actuator has a retracted, an extended, and an intermediate or parked position. Because the parked position may be approached from either the extended or retracted position, I provide four limit switches which are mounted above screw 336 in cover 327, and are designated "retract" limit switch 380, "retract-to-park" limit switch 381, "extend-to-park" limit switch 382, and "extend" limit switch 383. Switches 380—383 are mounted between a pair of end brackets 384, and have dependent operating plungers 385 to 388, respectively. All of the switches 380—383 are normally closed switches, and are operable upon raising of their respective operating plungers 385—388, to open internal electrical contacts.

Secured to the tubular cover 341 for movement with screw 336 is a ring cam 389, which is shown in FIGURE 5 as in a fully retracted position. At the left and right ends of cover 327 are cam followers 390 and 391, respectively, which are pivotally mounted upon horizontal pins 392 (FIGURE 7) for movement upwardly from a normal substantially horizontal position. Each of the followers 390 and 391 has a raised toe portion 393 which is adapted to be lifted upwardly by cam 389. The follower 390 has three operating positions as indicated in the detail FIGURE 12.

Before the cam 389 has passed under follower 390, the follower lies in the lower position as indicated in the phantom outline 390a. When cam 389 has passed by toe 393, follower 390 is raised to the position shown in solid outline, and when the cam has moved further to the left, the follower is raised fully to the position shown in the phantom outline 390b. The opposite follower 391 raises in the same manner, but merely has two operating positions, as shown in FIGURE 5, the lower position shown in solid outline, and the fully raised position shown in phantom outline.

Extending through brackets 384 beneath switches 380—383 is a rotatable shaft 394 that has a reduced outer end portion. Extending inwardly from the outer end of shaft 394 is a coaxial shaft 395 which fits over the reduced end portion of the latter and is independently rotatable. Fitted outboard of right-hand bracket 384, and affixed securely to shaft 395, is a sleeve carrying a rearwardly extending crank arm 396, as is seen in FIGURE 7. A similar sleeve and crank arm 397 is secured to shaft 394 outboard of the left-hand bracket 384. Shaft 394 extends beneath all of the switches 380—382, while shaft 385 is shorter and extends only beneath switch 383.

Spaced along shaft 394 directly beneath each of the operating plungers 385 to 387 are switch operating cams 400 to 402, respectively, which are keyed for rotation with the shaft. Keyed to the shaft 385 directly beneath operating plunger 388 is a single switch operating cam 403.

When ring cam 389 is located between the followers 390 and 391, the followers seat downwardly against the surface of tube 341, as indicated in the end view of FIGURE 7. When cam 389 is moved in the extending direction and approaches the fully extended position, cam 389 rides beneath follower 391 and raises the free end of the follower and pivotally raises crank arm 396 which is seated downwardly thereon. Pivoted movement of arm 396 causes pivotal movement of shaft 395 and cam 403. As is seen in FIGURE 11, the cam 403 has a cam rise 404 which is adapted to raise operating plunger 388 upon rotation to a position thereunder. The angular rotation of cam 403 from the normal to the operating position is indicated by the directional arrow. Upon elevation of plunger 388, the internal contacts within "extend" switch 383 are opened to mark the fully extended position of screw 336.

When cam 389 lies outwardly of follower 390, the latter lies horizontally with crank arm 397 seated thereon. As follower 390 is lifted, the crank 397 is pivoted upwardly to rotate shaft 394 and cams 400 to 402. The cams 400 to 402 have cam rises 405 to 407, respectively, thereon which are adapted to raise the switch-operating plungers 385 to 387, as is indicated in the diagrammatic views FIGURES 8 through 10. The position of cams 400 to 402 as seen in FIGURES 8 to 10 is the position in which follower 390 is fully raised, corresponding to the position 390b shown in FIGURE 12. The angular rotation of cams 400 to 402 from the position shown through the position in which follower 390 is partially raised and then horizontally extended, is indicated by the directional arrows.

When follower 390 is fully raised, cam rise 405 lifts plunger 385 to open "retract" switch 380 and thus mark the fully retracted position of screw 336. In this position the "retract-to-park" switch 381 is closed, and the cam rise 406 lies counterclockwise of operating plunger 386 as seen in FIGURE 9. As follower 390 is lowered to the position in which cam 389 lies adjacent toe 393, cam rise 406 rides in a clockwise direction to raise plunger 386 and open switch 381. Thus, when screw 336 is traveling from the retracted to the parked position, the opening of switch 381 marks the parked position of the screw 336 when that position is approached from the fully retracted position.

The operation of the "extend-to-park" switch 382 and the cam 402 is indicated in FIGURE 10. When screw 336 is fully extended, the follower 390 occupies its lowermost position, and cam 402 is in a corresponding position rotated counterclockwise from that shown in FIGURE 10 by the full amount of angular rotation indicated by the long arrow. As screw 336 travels toward the parked position from the extended position, cam 389 passes beneath the toe 393, and when the parked position is reached, cam 389 lies just inwardly of the toe in the position shown in solid outline in FIGURE 12. The resulting lifting of follower 390 to the position shown in solid line in FIGURE 12 causes the cam 402 to be rotated counterclockwise through an amount indicated by the short directional arrow, to thus raise the plunger 387 and open switch 382. Operation of "extend-to-park" switch 382 marks the parked position of screw 336 when it is moved from the extended position to the parked position.

For controlling the operation of motor 346 I provide control switches which are designated as an "extend" control switch 410, a "retract" control switch 411, an "extend-to-park" control switch 412, and a "retract-to-park" control switch 413. As is seen in the eletcrical circuit (FIGURE 6), switches 410—413 are each connected to one side of a D.C. power supply 414 by a conductor 415, the other side of the power supply being connected to ground as shown at 416. Motor 346 is of the D.C. split series field type having "extend" and "retract" field windings 417 and 418, respectively, connected in series with an armature 419 and then to ground 416. Between the field windings 417, 418 and coil 419 is a thermal overload switch 420 and a clutch coil 421 which is adapted to energize the magnetic clutch and brake unit 348. When clutch coil 421 is de-energized, driving pinion 347 is held against rotation, and when the clutch coil is energized, the pinion is coupled for rotation with motor 346 in the manner previously described for the preferred actuator.

Extending from the "extend" switch 410 to the "extend" winding 417 is a conductor 422, while a similar conductor 423 joins the "retract" switch 411 with the "retract" winding 418. The "extend" load limit switch 366, and the "extend" travel limit switch 383 are connected in series in conductor 422, and the "retract" load and "retract" travel limit switches 367 and 380 are connected in series in conductor 423. Upon closing "extend" switch 410, the motor 346 is energized through "extend" winding 417 to extend screw 336. If the thrust load limit is exceeded during the extension of screw 336, load limit switch 366 opens to de-energize motor 346. When the outer limit of travel is reached, switch 383 opens to de-energize motor 346, and stop screw 336 in the extended position.

Upon closing "retract" switch 411, motor 346 is energized through the "retract" field 418 to drive screw 336 in a retracting direction. An excessive thrust load during the retracting travel opens load limit switch 367 to de-energize motor 346. When the inner limit of travel is reached, retract limit switch 380, which is normally closed, opens to de-energize motor 346 and stop screw 336 in the retracted position. In FIGURE 6, switch 380 is shown in the open position in correspondence to the mechanical position of the elements shown in FIGURE 5. It can therefore be appreciated that by closing the "extend" or "retract" switches 410 and 411 I am able to drive screw 336 to the extended or retracted positions, respectively.

When it is desired to drive screw 336 from the extended to the parked position, switch 412 is closed. Since the movement desired is in a retracting direction, switch 412 is connected to "retract" winding 418 by a conductor 425 which joins conductor 423 ahead of limit switches 380 and 367, and which includes the normally closed "extend-to-park" limit switch 38 . As switch 382, opens, motor 346 is deenergized and screw 336 is stopped in the parked position. If during the travel of screw 336 to the parked position an excessive thrust load occurs, load switch 367 is operable to stop the travel of the screw.

To drive screw 336 from the retracted to the parked position, switch 413 is closed. Since the desired movement is in an extending direction, switch 413 is connected to "extend" winding 417 by a conductor 426 which joins conductor 422 ahead of limit switches 366 and 383, and which includes the normally closed "retract-to-park" limit switch 381. Opening of switch 381 de-energizes motor 346 to stop screw 336 in the parked position. If the thrust load becomes excessive during the travel to the parked position, load switch 366 opens to stop the travel of screw 336. By the operation of switches 412 and 413 I am therefore able to move screw 336 from either the extended or retracted positions to the intermediate parked position.

While I have shown and described specific embodiments of my invention which are particularly adapted to meet the requirements of the specific applications described, it will be understood that various of the components and their respective functions may be combined in different ways than are herein specifically set forth. Therefore, my invention is not to be restricted to the foregoing details of construction, except as defined in the appended claims.

I claim:

1. In combination with a linear actuator which includes a rotatable driving nut, a reversible electric motor drivingly connected to the nut, a pair of normally closed load limit switches connected to the motor and mounted in spaced relationship with opposed operating plungers projecting therefrom, a non-rotatable driving screw threadedly engaged with the nut for limited axial movement in either direction, control means comprising: a pre-loaded spring sub-assembly having a ring in which the nut is slidably movable, a fixed seat member on one side of said ring, a removable retainer seat member on the other side of said ring clamping said ring against said fixed seat member, springs disposed on both sides of said ring and compressed between said ring and said members to a predetermined pre-load, each of the springs being engageable with a projection on said nut to prevent axial movement thereof until the axial force on the nut overcomes said pre-load and compresses said springs; a slidable switch operating arm mounted for movement with the nut; and a crank pivotally mounted between the switches and connected to the plungers for movement therewith, said crank being operable to engage one of the plungers to open one of the switches upon movement of the screw in one direction and to engage the other of the plungers to open the other of the switches upon movement of the screw in the other direction.

2. In a linear actuator that has a rotatable driving nut, an axially movable and nonrotatable driven screw threadedly engaged with the nut for axial movement relative thereto, a reversible motor for operating the nut, an extend limit switch operable to move from a normally closed to open position, an intermediate limit switch operable to move from a normally closed to open position, control means comprising: cam means mounted for movement with the screw including a fixed extend cam and a longitudinally adjustable intermediate cam; a pair of concentric shafts, each supported for independent angular movement; a pair of crank arms, each fixed to a respective one of said shafts, one of said crank arms being adapted for angular movement by engagement only with said extend cam, and the other of said arms being adapted for angular movement by engagement with said intermediate cam; and means carried by said shafts for actuating the respective switches in response to said angular movements.

3. In a linear actuator which includes a rotatable driving nut, a reversible electric motor drivingly connected to the nut, limit switches connected to the motor and adapted to be operated by operating elements to move from a normally closed to open position, and a nonrotatable driven screw threadedly engaged with the nut for axial movement relative thereto, control means comprising: a ring cam mounted for movement with the screw; a pair of followers fixed relative to the nut and adapted to be pivotally moved by engagement with the cam; a pair of concentric shafts fixed to the respective followers, each being rotatable in response to pivotal movement of a respective one of said followers; and a switch-operating element to be operated by each of said shafts upon movement of said followers by said cam.

4. In a linear actuator, the combination of: a pair of angularly movable crank arms; a pair of coaxial shafts, each adapted for independent angular movement in response to angular movement of a respective one of said crank arms; cam apparatus; means to move said cam apparatus along a line parallel to the axis of said shafts and effect angular movement of said crank arms; a drive motor for the actuator; a control network for said motor having switches with plungers to be actuated at different positions of said cam apparatus on said line; and switch actuating means coupled to and operable through said shafts in response to angular movement of said crank arms to actuate the plungers, and thereby control operation of said motor.

5. A combination as defined in claim 4, wherein one of said shafts is a sleeve surrounding the other shaft, said crank arms being fixed to the respective shafts and extending transversely thereof, said crank arms being substantially equal in length, said crank arms being normally nonparallel, and said switch-actuating means including arms fixed to said shafts and extending transversely thereof.

6. A combination as defined in claim 5, wherein the cam apparatus includes portions adapted for adjustable spacing on said line, the different portions being of different size to engage the respective crank arms.

7. A combination as defined in claim 4, wherein said shafts are placed end to end, said crank arms being pivotally mounted on axes at right angles to the axis of said shafts; respective transverse arms on said shafts to be engaged by said crank arms for turning the shafts; means supporting said switches along a line parallel to the axis of said shafts; and respective cams on said shafts for operating respective ones of said plungers in different angular positions of said shafts.

8. In combination with a plurality of switches spaced along a line, the switches having respective plungers, switch control means comprising: a pair of angularly movable crank arms; a pair of coaxial shafts, each adapted for independent angular movement in response to angular movement of a respective one of said crank arms; cam apparatus; means to move said cam apparatus along a line parallel to the axis of said shafts and effect angular movement of said crank arms; and switch actuating means coupled to and operable with said shafts in response to angular movement of said crank arms to actuate the plungers.

9. The combination defined in claim 8, wherein one of said shafts is a sleeve surrounding the other shaft, said crank arms being fixed to the respective shafts and extending transversely thereof, said crank arms being substantially equal in length, said crank arms being normally nonparallel, and said switch-actuating means including arms fixed to said shafts and extending transversely thereof.

10. The combination defined in claim 8, wherein said shafts are placed end to end, said crank arms being pivotally mounted on axes at right angles to the axis of said shafts; and respective transverse arms on said shafts to be engaged by said crank arms for turning the shafts.

References Cited in the file of this patent

UNITED STATES PATENTS

| | | |
|---|---|---|
| 2,077,053 | Neuman | Apr. 13, 1937 |
| 2,431,929 | Goff | Dec. 2, 1947 |
| 2,441,505 | Ochtman | May 11, 1948 |
| 2,446,393 | Russell | Aug. 3, 1948 |
| 2,482,464 | Chapman | Sept. 20, 1949 |
| 2,531,109 | Chapman | Nov. 21, 1950 |
| 2,566,824 | Carlson | Sept. 4, 1951 |
| 2,574,684 | Andrews et al. | Nov. 13, 1951 |
| 2,590,251 | Hoover | Mar. 25, 1952 |
| 2,606,257 | Briskin | Aug. 5, 1952 |
| 2,679,559 | Morris et al. | May 25, 1954 |
| 2,809,736 | Hoover | Oct. 15, 1957 |